United States Patent [19]

Tsai

[11] Patent Number: 4,639,375

[45] Date of Patent: Jan. 27, 1987

[54] ENZYMATIC TREATMENT OF BLACK TEA LEAF

[75] Inventor: Chee-Hway Tsai, Cincinnati, Ohio

[73] Assignee: The Procter & Gamble Company, Cincinnati, Ohio

[21] Appl. No.: 522,878

[22] Filed: Aug. 12, 1983

[51] Int. Cl.$^4$ .................... A23F 3/00; A23B 7/10; A23K 1/00
[52] U.S. Cl. ...................... 426/49; 426/52; 426/597
[58] Field of Search .......... 426/49, 52, 597; 435/267

[56] References Cited

U.S. PATENT DOCUMENTS

| | | | |
|---|---|---|---|
| 3,117,004 | 1/1964 | McFarlane et al. | 99/28 |
| 3,959,497 | 5/1976 | Takino | 426/52 |
| 4,051,264 | 9/1977 | Sanderson et al. | 426/52 |
| 4,472,441 | 9/1984 | Clark et al. | 426/597 X |
| 4,478,939 | 10/1984 | Adler-Nissen | 426/52 X |
| 4,483,876 | 11/1984 | Petersen | 426/49 X |

FOREIGN PATENT DOCUMENTS

| | | |
|---|---|---|
| 134718 | 7/1974 | India . |
| 1249932 | 10/1971 | United Kingdom . |
| 1380135 | 1/1975 | United Kingdom . |
| 1413351 | 11/1975 | United Kingdom . |
| 1546508 | 5/1979 | United Kingdom . |

OTHER PUBLICATIONS

Windholz, M. et al., *The Merck Index*, 10th edition, Merck & Co., Inc., N.J. 1983, pp. 791, 1007.
Sanderson, G. W. et al, "Use of Enzyme in the Manufacture of Black Tea and Instant Tea", ACS Symposium Series, 1977, vol. 47, pp. 12–26.
Sanderson, G. W., *Geruch-und Geschmackstoffe*, Verlag Hans Carl, West Germany, 1975, pp. 65–97.
Roberts, J. Sci. Food Agric., 3, 193–8 (1952).

*Primary Examiner*—Robert J. Warden
*Assistant Examiner*—Jeremy M. Jay
*Attorney, Agent, or Firm*—Eric W. Guttag; Rose Ann Dabek; Richard C. Witte

[57] ABSTRACT

A process for the enzymatic treatment of black tea leaf is disclosed. In particular, black tea leaf is wetted with water containing tannase and one or more cell-wall-digesting enzymes, such as cellulase, pectinase, papain, or hemicellulase, prior to extraction. The enzyme-moistened tea leaf is incubated in a closed system at room temperature for a few hours. The enzyme-treated tea is then neutralized with a suitable food grade base and the enzymes are inactivated by heating. The resulting treated tea can be extracted and processed in the usual manner or dried for use in tea bags in the usual manner. As a result, a higher yield of tea is obtained and the resulting instant tea has better solubility in cold water than conventional teas. The bag tea products an infusion which does not form haze at cold temperatures.

10 Claims, No Drawings

ENZYMATIC TREATMENT OF BLACK TEA LEAF

TECHNICAL FIELD

This invention relates to the enzymatic treatment of black leaf tea.

"Teas", loosely defined, can be made from a variety of botanical materials by extraction with water. Of particular importance is *Camellia sinensis,* or "true" tea, which accounts for a large proportion of the world's tea consumption. Two- to three-leaf shoots of the tea plant are harvested for processing.

Tea processing technology is aimed at modifying the chemical composition of the raw tea leaf material in order to produce new flavor and aroma compounds, responsible for the taste, color and aroma of the manufactured teas that are so highly valued by the consumer. Green tea leaf has a bitter taste and grassy odor. This is transformed into an aromatic and flavorful manufactured tea by biochemical processes which are well known.

In the production of conventional black tea, the tea leaves undergo the following treatment processes: (1) withering, (2) rolling and sorting, (3) fermentation, (4) firing, and (5) final sorting of the dried tea. These steps are described in excellent detail by Bokuchava et al., "Biochemistry and Technology of Tea Manufacture", *CRC Critical Reviews and Science and Nutrition,* 12 (4) pp. 309-370 (July 1980), which is incorporated herein by reference. The fermentation process for conversion of green teas to black tea is well known to involve a variety of enzymes, including those used herein. This role of enzymes is well summarized in two articles, Sanderson and Coggon, *ACS Symposium Series,* 47, 12-26 (1977), and Roberts, *J. Sci. Food Agric.,* 3, 193 (1952).

Manufactured teas on the world market can be subdivided into four groups with respect to the processing employed. This classification is based on the activity of tea enzymes in the course of raw tea treatment. Enzyme action throughout the entire process, including withering and fermenting stages, yields fermented teas which include all brands and grades of black tea, including instant tea made from black tea. Arresting the enzyme activity at an early stage of tea processing by steaming or roasting the raw tea provides unfermented or green tea, which has a specific taste and aroma. Partial (10% to 15%) action of enzymes in processing yields a yellow tea with a flavor and aroma different from the flavor and aroma of green tea and/or heavily processed teas. Partial but greater (20% to 30%) action of the enzymes yields red, or oolong tea, which has a rich, strong aroma and flavor, and a reddish color.

Unfortunately, prior art tea processing techniques involve only partial conversion of tea aroma and flavor precursors to tea aroma and flavor compounds. Further, prior art techniques are able to extract only a portion of these aroma and flavor compounds from the black fermented tea leaf. Still further, many of these materials, once extracted, are prone to polymerization, precipitation and insolubility problems, further reducing the overall quality and overall yield of the tea.

U.S. Pat. No. 4,051,264, issued in 1977 to Sanderson et al., teaches the conversion of nonfermented (green) tea to black tea by the use of tannase. However, the patentees state that it is important to apply the tannase treatment before any "permanent" insolubilization of the tea leaf solids has occurred as a result of the more orthodox black tea manufacturing process.

It is an object of this invention to provide an enzymatic process for the treatment of black tea leaf which produces a high fidelity product in greater yield.

It is another object of this invention to provide a process for enzymatic treatment of black tea leaf which produces a product having greater cold water solubility than conventional black tea extracts, These and other objects of the invention will be evident from the following disclosure.

DISCLOSURE OF THE INVENTION

The process of this invention involves pre-treatment or conditioning of black tea leaf with an enzyme solution containing tannase in conjunction with cell-wall-digesting enzymes such as cellulase, pectinase, and hemicellulase, after conventional fermentation but prior to extraction.

In accordance with this invention it has been found that clarified tea infusions can be obtained from black tea which has been treated with tannase in conjunction with the cell-wall enzymes of this invention, such as cellulase, pectinase or hemicellulase prior to extraction. While not intending to be limited by theory, the likely mechanism by which this process works is that upon imbibition of enzyme solution by black tea leaf and the swelling of black tea leaf tissues, the enzymes are absorbed into or absorbed onto the tissues, causing the release of immobilized teal solids from tea leaf material and hydrolysis of released tannins to provide a higher yield of cold-water soluble tea solids. The cell-wall enzymes are specific for hydrolysis of major cell-wall components, such as cellulose, pectin, hemicellulose, lipids and protein.

In a preferred process process of this invention, black tea leaf is mixed with an enzyme solution at a weight ratio of from 1:4 to 2.5:1. The enzyme solution contains tannase and one or more cell-wall-lysis enzymes. Preferably, the enzyme solution contains from 0.5 to 32 units of tannase per gram of black tea, and from 5 to 20 units of cellulase, pectinase, or hemicellulase, or a mixture thereof, per gram of black tea. The wetted tea is incubated, preferably in a closed system at a temperature of from about 20° to about 65° C. for from ½ to 20 hours. The resulting enzyme-treated black tea is neutralized with an edible base to the desired final pH. The enzymes are inactivated by heating to a temperature greater than about 65° C., and the tea is then ready for conventional packaging or extraction.

STARTING MATERIALS

The starting tea material of this invention is black tea leaf. While tea particle size is not critical to the practice of this invention, most imported black tea has already been finely comminuted in processing, and a fairly fine grind is preferred to provide maximum surface area for wetting of the tea. Ground black tea can be used as received, and typically has a particle size distribution providing roughly 45% retained on a 20 mesh screen and essentially none through a 48 mesh screen. This is preferably further ground by any convenient means so that about 15% are retained on a 20 mesh screen and about 5% are through a 48 mesh screen. (All percentages are measured by screening the tea on metal sieves on a Ro-Tap shaker, made by Tyler Industrial Products, for 3 minutes.)

Enzyme Solution

By "cell-wall-digesting enzyme" herein is meant an enzyme which breaks down one or more tea cell-wall constituents to simpler materials and thus reduces the structural integrity or increases the permeability of the cell wall. Plant cell walls are composed primarily of cellulose, but contain lesser amounts of proteins, hemicellulose, pectins, and lipids. Accordingly, cell-wall-digestive enzymes include cellulase and hemicellulase, proteases such as papain, pectinase, dextranase, lysozyme and lipases, such as pancreatic lipase or castor-oil lipase.

In the practice of this process, the black tea leaf is preferably only wetted with enzyme solution. No free-flowing "tea juice" is created. Since tea absorbs about 2.5 times its weight in water, the tea is preferably wetted with enzyme solution in a solution:tea ratio of from about 1:4 to about 2.5:1. Enzymes can be used at any convenient level. Higher levels of enzyme permit shorter incubation times, but are also more expensive.

The enzyme tannase which is used in this invention is known to hydrolyze the ester linkages of tannic acid between gallic acid and glucose. It also attacks gallic acid methyl ester. The enzyme is an elaboration product of the growth of certain molds belonging to the genera Aspergillus and Penicillium. Aspergillus flavus grown on a medium containing tannic acid as a sole carbon source provides tannase in substantial amounts. Two other specific strains of microorganisms known to produce substantial quantities of tannase are Aspergillus oryzae, ATCC No. 9362, and Aspergillus niger, ATCC No. 16888. One suitable preparation of tannase enzyme is available commercially from the Enzyme Development Corporation. Yet another is available from Novo Industri A/S, Bagsvaerd, Denmark. The other cell-wall-digesting enzymes, such as cellulase, papain, pectinase, and hemicellulase can be obtained from similar commercial enzyme sources. Examples of measurement of enzyme activity are given below.

One unit of tannase activity in the practice of this invention is defined as the amount of enzyme which is able to hydrolyze one micromole of ester bond in tannic acid in 1 minute under the following conditions:

Substrate: tannic acid (0.35%, weight/volume in 0.1 m. phosphate buffer, pH 5.5).
Temperature: 30° C.
Enzyme concentration: approx. 4–6 units/ml. (estimated)
Reaction time: 10 minutes This method is described by Iibuchi, S., Minoda, Y. and Yamada, K., "Studies on Tannin Acyl Hydrolase of Micro-organisms, Part 2. A new method determining the enzyme activity using the change of UV absorption", Agricultural and Biological Chemistry, Vol. 31 (5), pp. 513–18 (1967).

The procedure was as follows: To four parts of substrate (0.350 w/v% of tannic acid dissolved in 0.05M citrate buffer, pH 5.5), one part of the enzyme solution was added. After t minutes reaction at 30° C., 0.1 part of the mixture was added to ten parts of 90% ethanol.

The optical density of the ethanol solution at 310 mμ was measured. Tannase activity (unit/ml) was given by following equation.

$$u = 114 \times \frac{E_{t1} - E_{t2}}{t_2 - t_1}$$

Where $E_{t1}$ and $E_{t2}$ mean the optical density of the ethanol solution at 310 mμ prepared after $t_1$ and $t_2$ minutes reaction, and one unit of the enzyme means the amount of the enzyme which is able to hydrolyze one micro mole of the ester bond in tannic acid in one minute.

One unit of cellulase activity is defined as the amount of enzyme required for producing 1 micromole of reducing carbohydrate per minute under the following conditions:

Substrate: avicell microcrystalline wood cellulose, 10 gram/liter.
pH: 4.8
Temp.: 50° C.
Reaction time: 20 minutes
Enzyme concentration: 0.01–0.03 units/ml. (estimated)

Pectinase activity is expressed in polygalacturonase units (pgu). One pgu is defined as the amount of enzyme required to release 1 micromole of reducing group from pectic acid per minute. The reducing group is determined by adding excess iodine solution and back titrating with sodium thiosulfate solution. The method is described by Colowick, S. P. and Kaplan, and O, Methods in Enzymology, Vol. 1, pp. 162–64 (1955).

To 99 ml. of 0.5% pectic acid, previously adjusted to pH 4.0 and 25°, 1 ml. of enzyme soluton is added. The time is noted, and 5-ml. aliquots are removed at various times (depending on enzyme activity) and added to 0.9 ml. of the $Na_2CO_3$ solution in a glass-stoppered flask. Now 5 ml. of iodine solution is added, and after thorough mixing the mixture is allowed to stand for exactly 20 minutes; then 2 ml. $H_2SO_4$ is added and the excess of iodine titrated with the $Na_2S_2O_3$ soluton. A calibration curve is prepared with the galacturonic acid monohydrate solution. Under these conditions 1 meq. of reduced iodine corresponds to 0.513 mM. of aldose liberated. Controls are run without enzyme as well as with heated enzyme solution. The activity may be expressed as (PG u.)/ml., indicating the millimoles of reducing groups liberated per minute per milliliter of enzyme.

Activities of other cell-wall digesting enzymes can be measured, and suitable levels determined, by recourse to standard reference texts in enzymology. In general, it is acceptable to have sufficient cell-wall digesting enzyme(s) to cause measurable digestion and fermentation of cell-wall components in the tea leaf.

Incubation

The enzyme-wetted tea is then incubated to cause partial digestion and fermentation of the tea. This fermentation and digestion is in addition to the fermentation and digestion which occurs in conventional black tea processing. Incubation is preferably done in a closed system at temperatures of from about 20° C. to about 65° C., for from ½ to about 20 hours. The closed system insures that delicate aroma volatiles are neither lost nor damaged. Inert gas blanking of the incubating tea is also preferred to avoid oxidative damage to delicate flavor and aroma volatiles, but is not required for the enzymatic reactions to proceed. The enzymes are active at temperatures ranging from well below ambient up to about 65° C., at which temperature the enzymes are destroyed. Temperatures below about 20° C. are acceptable, but, because they are below ambient, require cooling and longer process times and therefore are less preferred. A temperature of about 40° C. is optimal. Incubation times from ½ hour to 20 hours are acccepatable, but times greater than about 4 hours produce little noticeable change in end results, and therefore shorter times are preferred. An optimum incubation time is about 2½ hours. The tea can be gently agitated to assure uniform wetting, but agitation is not required during incubation.

Neutralization

During the course of incubation, the action of the enzymes upon released tea solids causes acidification of the incubating tea leaf. In particular, gallic acid and other organic acids are released by enzymatic action upon polymeric tea solids, with a consequent reduction in pH to 4.25 to 4.75. This pH range is organoleptically unacceptable for tea. Therefore, in the practice of this invention it is important to neutralize the tea to a typical tea pH in the range of from 4.75 to 5.75, preferably 5.0 to 5.5. Neutralization can be accomplished with any food-compatible base, such as sodium hydroxide, sodium bicarbonate, potassium hydroxide, potassium bicarbonate, etc. The level of base added can range from about 3 mg. to about 60 mg. per gram of black tea, depending upon the starting pH and the desired final pH of the tea product. By the terms "food-compatible" and "edible" herein is meant both toxicological and organoleptic acceptability under the conditions of use in this invention.

Neutralization can be performed at any convenient point in processing after incubation. Preferably it is performed immediately after incubation, but it can be postponed until after extraction, for example. Then, of course, it is the extract which is neutralized.

Enzyme Inactivation

Following neutralization of the tea by addition of edible base, the enzymes used should be inactivated by denaturing. The enzymes can be denatured by, for example, exposure to heat. The heat can be supplied by any conventional means, including microwave, irradiation, conductive or convective air heat or steam heat. Inactivation of the enzymes can also be achieved during the tea leaf drying process, providing the drying oven temperature and drying time are sufficient. If hot water or steam are used for extraction of the leaf tea, these can be used for inactivation of the enzymes, provided the temperatures are high enough and the extraction step substantially immediately follows the incubation step. Preferably, for good flavor retention, the minimum heat exposure necessary for inactivation of the enzymes is used. For example, freeze drying or vacuum ove drying is better than regular atmospheric oven drying in terms of flavor retention.

Further Processing

Following or concurrent with enzyme inactivation, the tea is further processed by conventional techniques. It can be dried for sale in bulk or in bags, or extracted for production of soluble tea products. The processed leaf tea of this invention produces an extract the solids of which are substantially completely soluble in cold (4° C.) water, as measured by the technique used in Example 1, below, when extracted with boiling water to an extract solids concentration of from 0.3% to 10%.

It will be appreciated that the process of this invention is compatible with conventional art techniques for stripping and recycling or re-addition of aroma and flavor components, as already used in tea processing.

All percentages herein are by weight unless otherwise indicated. The following examples illustrate the features of this invention without intending to be limitative thereof.

EXAMPLE 1

125 gram portions of a black tea blend were mixed with 100 ml. distilled water, 100 ml. distilled water containing 500 units of tannase, and 100 ml. of distilled water containing 500 units of tannase plus 2500 units of cellulase, respectively, in closed gallon jars. All three samples were incubated at 25° C. for 3 hours. At the end of the 3 hours, 6.5 ml. of 2M potassium bicarbonate solution was added to the jar containing tannase alone, and 11.5 ml. of 2M potassium bicarbonate solution was added to the jar containing tannase plus cellulase. Each of the samples was heated in a microwave oven (Sharp Model R-7600, 700 watt, 2450 MHz) for 3 minutes at full power to stop the enzymatic reactions. 1250 ml. of boiling distilled water was added to each jar and each sample was stepped for 10 minutes in the closed jar. The tea extract was separated from the spent tea leaf by filter paper. The tea extract was cooled to 10° C. in an ice bath. The cold extract was filtered through a diatomaceous earth-coated filter paper (24 cm. diameter). The final extract was then freeze dried to tea powder. The results are presented in Table 1.

TABLE 1

Effect of tannase/cellulase treatment on extraction yield in cold water solubility of instant tea.

| Treatments | % Solids of Tea Extract[a] | % Extraction Yield[b] | % Insoluble in Iced Water[c] |
|---|---|---|---|
| Control | 2.59 | 22.2 | 9.0 |
| Tannase | 2.84 | 24.2 | 3.0 |
| Tannase + Cellulase | 3.30 | 30.4 | 0.0 |

[a]% solids was determined with a Bausch & Lomb refractometer.
[b]% extraction yield = (% solids of tea extract × total weight of tea extract)/weight of black tea.
[c]insoluble in iced water was measured by filtering out insoluble solids in iced water with a filter paper and determining the dry weight of insoluble solids after drying to constant weight in an oven.

In Table 1, extraction yield was increased substantially by tannase plus cellulase. The instant tea produced after tannase/cellulase treatment is completely soluble in iced water.

EXAMPLE 2

Four hundred grams of a black tea blend was mixed well with 400 ml. of enzyme solution containing 200 units of tannase and 7500 units of pectinase in a glass jar and incubated at 40° C. in a water bath for 3 hours with the jar closed. The enzyme-heated tea was loaded into an extraction column (Pyrex, 13×33 cm). Steam was injected from the top of the column onto the tea bed. The temperature in the middle of the tea bed reached about 70° C. The steam injection process was repeated twice in 10 minutes. Then 3000 ml. of boiling distilled water was introduced from the top of the column and the tea extract was pulled by vacuum into a receiving tank connected to the bottom of the extraction column. The receiving tank was submerged in an iced water bath. The maximum bed temperature reached 65° C. at the end of the extraction. The boiling distilled water was introduced at a rate of 100 ml. per min. and the whole extraction process took 40 minutes. Another glass tank submerged in liquid nitrogen was connected between the receiving tank for tea extract and the vacuum source to recover tea volatiles. This tea volatile frost was added to the tea extract before drying. The pH of the tea extract was adjusted to 5.2 with 2M potassium bicarbonate solution. The extract was dried to powder by vacuum drum drying. The instant tea prepared by this process was completely soluble in iced water and looked reddish clear in a glass. Its taste was judged by expert tasters to be flavorful and brewlike. Two more separate extraction runs were performed without enzyme and with 200 units of tannase alone, respectively, under the same conditions. The results are summarized in Table 2.

TABLE 2

Effect of tannase/pectinase treatment on extraction yield in cold water solubility of instant tea.

| Treatments | % Solids of Tea Extract[a] | % Extraction Yield[b] | % Insoluble in Iced Water[c] |
|---|---|---|---|
| No enzymes[a] | 3.4 | 22.1 | 9.2 |
| Tannase[b] | 4.0 | 26.1 | 3.0 |
| Tannase + pectinase | 4.9 | 33.9 | 0.0 |

[a]average of three runs.
[b]average of two runs.
[c]average of five runs.

EXAMPLE 3

Fifty grams of the black tea blend used in Example 1 was mixed well with 50 ml. of enzyme solution containing 100 units of tannase and 500 units of pectinase. The wetted tea was incubated in a closed jar at 25° C. for 3 hours. After incubation, 3.75 ml. of 2M potassium bicarbonate solution was added to the tea sample. The tea sample was heated in a microwave oven as in Example 1, for 2 minutes. The tea sample was dried at 85° C. in an oven. A separate sample was prepared without enzyme, as a control. 2.25 gm. portions of the black teas prepared by these processes were put into "flow through" tea bags. For product evaluation, each tea bag was brewed in 250 ml. of boiling water for 3 minutes. Solids concentrations were determined with a Carl Zeiss Refractometer in the usual manner. Turbidity was measured with a Hach Ratio Turbidimeter, Model 18900. The turbidimeter can measure 0–200 Nephelometric turbidity units (NTU). The correlation between NTU and turbidity of tea in glass is described as follows:

0–50 NTU: crystal clear
50–100 NTU: clear
101–200 NTU: hazy

The results of the evaluation are summarized in Table 3.

TABLE 3

Brew solids and turbidity of enzyme-processed chill-proof bag tea.

| Treatments | % Brew Solids* | Turbidity at 4° C. (NTU)* | Appearance in Glass |
|---|---|---|---|
| Control | 0.26 | 141 & creamy | Brownish |
| Tannase + pectinase | 0.30 | 39 & clear | Reddish |

*Avg. of 4 replicates.

EXAMPLE 4

One hundred grams of black tea from commercial tea bags was mixed with 80 ml. of distilled water with 3,250 units of pectinase and 300 units of tannase and incubated in a closed jar at 40° C. in a water bath for 3 hours. Then 1.2 g. of vitamin C and 0.75 g. of sodium hexametaphosphate in 20 ml. of distilled water were added to the tea sample. For neutralization 12 ml. of 2M potassium bicarbonate solution was added. The tea sample was dried in a vacuum oven at 60° C. The dried tea sample was blended with 50 g. of fresh untreated black tea for better flavor. The blended sample was put into tea bags at 2.25 g. per bag and evaluated as in Example 3. The tea infusion brewed from the tea bags prepared by the enzyme process of this invention remained clear and reddish in a refrigerator for several days, while the control sample turned creamy and brownish within several hours under the same conditions.

EXAMPLE 5

The same procedures and materials were used as in Example 2, except that the tea extract was not dried to a powder. Instead, the tea extract was diluted with distilled water to drinking strength (0.4–0.5% tea solids). The diluted tea liquid was bottled in 10 oz. clear glass bottles and pasteurized as ready-to-drink iced tea. The resulting ready-to-drink iced tea in bottles stayed reddish and crystal clear at 40° for six months. It retained a brewlike tea flavor without the typical bitter and harsh taste of iced brewed tea.

What is claimed is:

1. A process for increasing the yield and tea solid solubility of black tea by enzymatic treatment, comprising the steps of:
   (1) wetting fermented black tea leaf prior to extraction with an enzyme solution comprising water, tannase and at least one cell-wall-digesting enzyme which breaks down one or more tea cell wall constituents to simpler materials wherein the tea leaf is combined with the enzyme solution at a tea:enzyme solution weight ratio of from about 4:1 to about 1:2.5;
   (2) incubating the enzyme-wetted tea to cause partial digestion and fermentation of the tea leaf in a closed system such that volatiles are not lost or damaged;
   (3) neutralizing the tea to a pH of from about 4.75 to about 5.75 with an edible base; and
   (4) inactivating the enzymes by heating.

2. A process according to claim 1 wherein the enzyme-wetted tea leaf is incubated at a temperature of from about 20° C. to about 65° C.

3. A process according to claim 1 wherein the enzyme-wetted tea leaf is incubated for from about 0.5 to about 20 hours.

4. A process according to claim 1 wherein the enzyme-wetted tea leaf is further incubated in an inert atmosphere.

5. A process according to claim 1 wherein the enzymes are inactivated by heating.

6. A process according to claim 1 wherein the cell-wall-digesting enzyme is a member selected from the group consisting of cellulase, hemicellulase, pectinase, dextranase, iysozyme, protease and lipase, and mixtures thereof.

7. A process according to claim 6 wherein the protease is papain.

8. A process according to claim 6 wherein the lipase is pancreatic lipase.

9. A process according to claim 6 wherein the enzyme solution contains from about 0.5 to about 35 units of tannase per gram of tea leaf, wherein one unit is the amount of enzyme which hydrolyzes one micromole of ester bond in 0.35% tannic acid in 0.1 m. phosphate buffer having a pH of 5.5 in one minute at 30° C.

10. An extractable tea product comprising black tea leaf which has been at least partially digested by treatment with tannase and at least one cell-wall-digesting enzyme, and which, when extracted with boiling water to yield a tea extract having a percent solids concentration of from 0.30% to 10%, produces an extract the solids of which are completely soluble in the water at 4° C.

* * * * *